United States Patent [19]

Kassai

[11] 4,042,249
[45] Aug. 16, 1977

[54] OPENING SYSTEM FOR FOLDING BABY CARRIAGE

[75] Inventor: Kenzou Kassai, Osaka, Japan

[73] Assignee: Kassai Kabushikikaisha, Osaka, Japan

[21] Appl. No.: 724,063

[22] Filed: Sept. 16, 1976

[30] Foreign Application Priority Data

July 17, 1976 Japan .................................. 51-85379

[51] Int. Cl.² ............................................. B62B 11/00
[52] U.S. Cl. ...................................... 280/38; 280/650
[58] Field of Search ................ 280/38, 650, 647, 641, 280/642, 644

[56] References Cited

U.S. PATENT DOCUMENTS

| 3,936,069 | 2/1976 | Giordani | 280/650 |
| 4,007,947 | 2/1977 | Perego | 280/650 |

Primary Examiner—Robert R. Song
Attorney, Agent, or Firm—Browdy and Neimark

[57] ABSTRACT

An opening system for a folding baby carriage is composed of a simple structure in which a backrest is operatively connected with an operating rod. When the operating rod is pulled up against a tensile force of a spring, gripping a handle by one hand with its forefinger positioned on the operating rod, legs are instantaneously opened to a use state.

2 Claims, 3 Drawing Figures

OPENING SYSTEM FOR FOLDING BABY CARRIAGE

BACKGROUND OF THE INVENTION

The present invention relates to an opening system for a folding baby carriage.

The folding baby carriage is particularly convenient when one is using conventional traffic facilities, and it is desired to have a baby carriage which is easy to open and to fold.

It is an object of the present invention to provide an opening system for a folding baby carriage which is convenient to use and which can readily effect the opening and folding of the baby carriage.

BRIEF DESCRIPTION OF THE DRAWING

Referring to the drawings.

DETAILED DESCRIPTION OF THE PREFERRED EMBODIMENT

Figure 1:
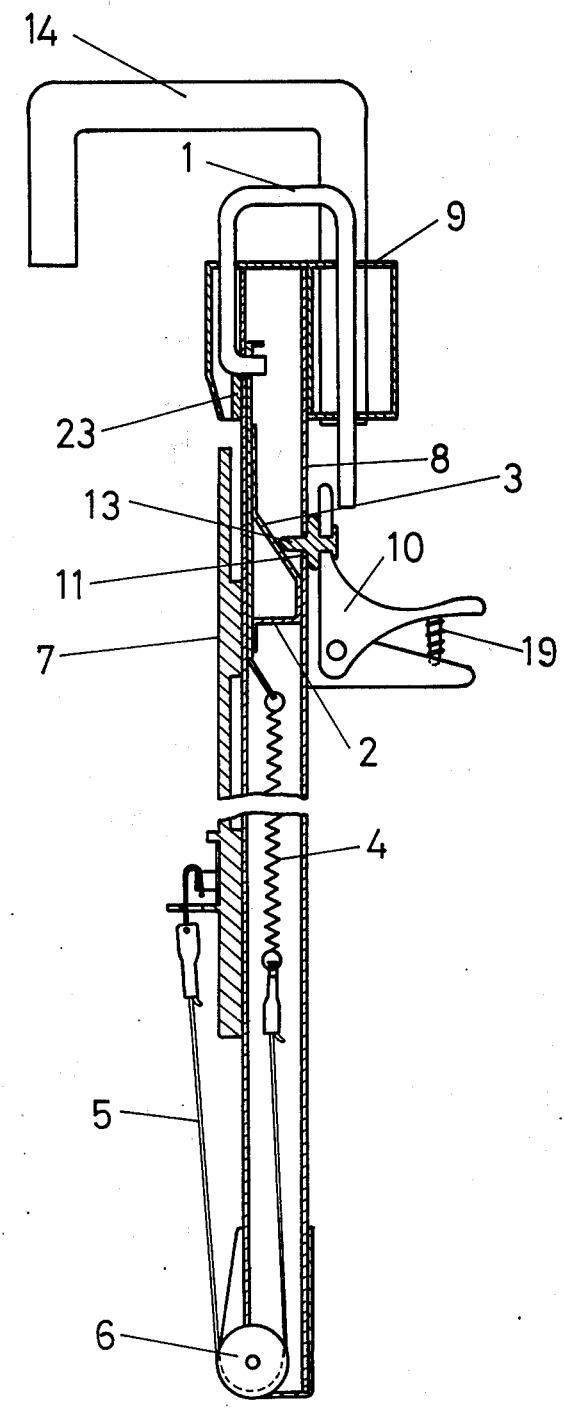
FIG. 1 is a longitudinal sectional view of an essential part of the opening system for a folding baby carriage according to the present invention.
Figure 2:
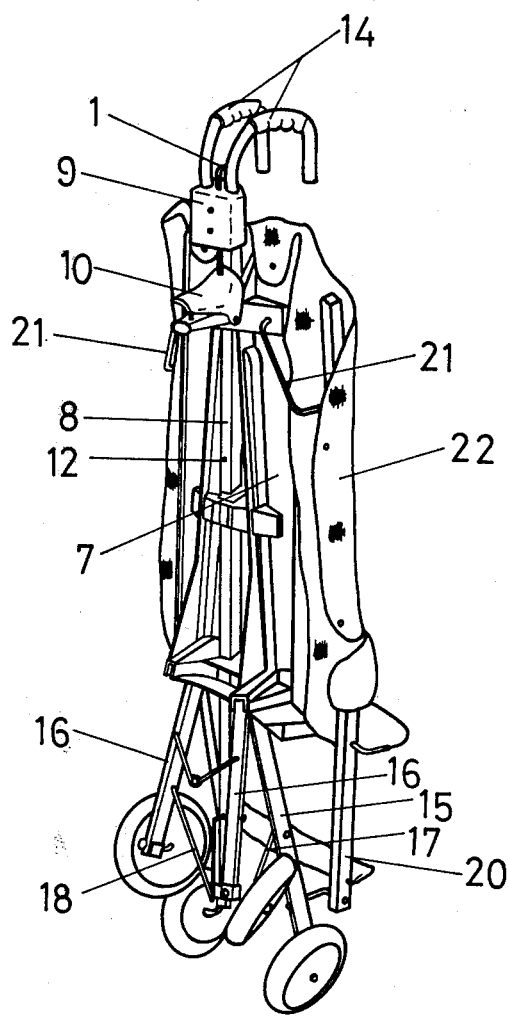
FIG. 2 is a perspective view illustrating the folding baby carriage of FIG. 1 in a folded state.
Figure 3:
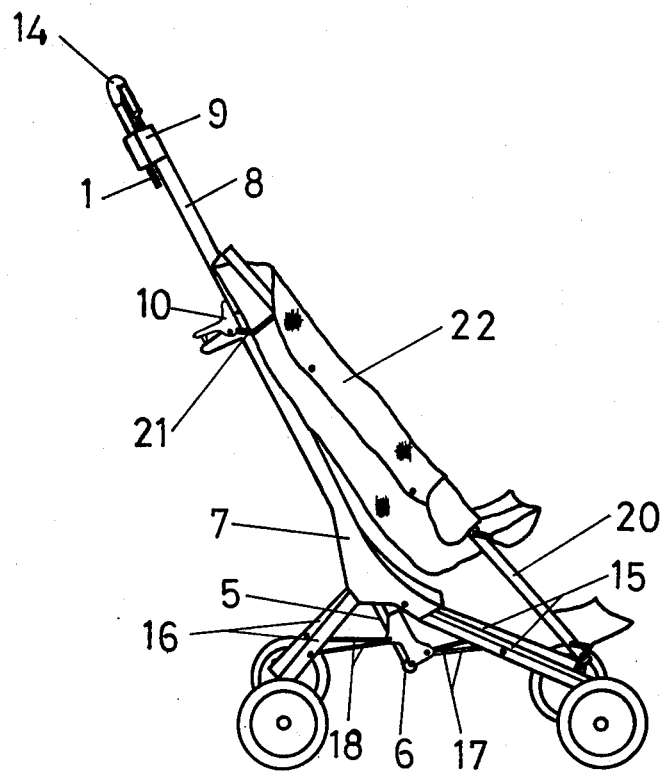
FIG. 3 is a side view illustrating the folding baby carriage open in its use state.

As illustrated in FIGS. 1-3, an exemplary embodiment of a folding baby carriage, according to the present invention, which can be folded into a slender shape, is constructed with a backrest 7 made of plastic material as a center portion. Front and rear legs 15, 15 and 16, 16 are provided at the bottom of the backrest 7, and a support 8 is slidably provided to the rear of the backrest 7. The bottom of the support 8 is connected with the front and rear legs 15, 15 and 16, 16 by connecting rods 17, 17 and 18, 18 so that the front and rear legs 15, 15 and 16, 16 are opened and folded accompanying sliding of the support 8. Two handles 14, 14 are provided extending from a box-shaped handle attachement 9 at the top of the support 8. A stopper 10, having a projection 13 thereof engaged in apertures 11 and 12, provided on the support 8, to maintain an opened or folded state, as the cases may be. Side rods 20, 20 are supported by the backrest 7 and connecting rods 21, 21. A seat 22 is fixed to the backrest 7 on the top and to the side rods 20, 20 on both sides.

A U-shaped operating rod 1 slidably provided near the handle attachement 9, which extends to the stopper 10 at one end to prevent the projection 13 from being removed and to prevent the folding baby carriage from opening unexpectedly in the folded state. The other end of the operating rod 1 is provided with a slider 2 which slides along the inner wall of the support 8. The slider 2 has an inclined upper portion 3 which pushes against the projection 13 of the stopper 10. The slider 2 is connected with one end of a spring 4, and the other end of the spring 4 is connected with a string, rope or cord 5 which extends over a guide wheel 6, provided at the bottom of the support 8, to the lower part of the backrest 7.

In the folded state of the baby carriage, the operating rod 1 is pulled downward by the spring 4, and is contacted with a stop 23 which is provided within the handle attachement 9. When the operating rod 1 is pulled up against a tensile force of the spring 4, gripping the handle 14 by one hand with the forefinger thereof placed on a bent portion of the operating rod 1, the operating rod 1, as well as the slider 2, are moved upward, and the projection 13 is pushed out by the inclined upper portion 3 to be released from engagement in the aperture 11. Because the other end of the string, rope or cord 5 is fastened to the lower part of the backrest 7, the backrest 7 is moved downwardly along the support 8 by its own weight and the tensile force of the spring 4 against friction on a sliding surface of the support 8. Thus, the legs 15, 15, 16, 16 are instantaneously opened to the use state. The projection 13 is engaged in the aperture 12 to maintain the use state by a spring 19. The baby carriage is folded according to the steps which comprise gripping the stopper 10 with one hand, releasing the projection 13 from engaging in the aperture 12, pressing down the handle 14 with the other hand, downwardly sliding the support 8, and engaging the projection 13 in the aperture 11.

The part of the backrest 7 which in use rubs against the support 8 may be suitably provided with a ridge or with a roller to smoothly slide the backrest 7 along the support 8.

What is claimed is:

1. A folding baby carriage comprising, in combination:

a backrest having a bottom portion and a back;

front and rear legs pivotally connected to said bottom portion of said backrest;

a support having a bottom, being made of tubing material, and slidably provided at said back of said backrest;

connecting rods, said bottom of said support being connected with said front and rear legs by said connecting rods so that said front and rear legs are opened and folded in accompaniment with sliding of said support;

a stopper integrally provided at said back of said backrest engageable in apertures provided in said support to maintain alternatively an opened and folded state; and a U-shaped operating rod having a first end and a second end slidably provided at a handle attachment extending to said stopper at said first end and being provided with a slider having an inclined upper portion in contact with a projection of said stopper at said second end, and said slider being connected through a spring with a flexible connecting means extending over a guide wheel provided at said bottom of said support, to said bottom of said backrest.

2. A folding baby carriage according to claim 1, wherein said bottom portion of said backrest is provided with a hook receiving member and an end of said flexible connecting means is provided with a hook positionable in said hook receiving member.

* * * * *